(12) United States Patent
Canigliula et al.

(10) Patent No.: US 12,434,749 B2
(45) Date of Patent: Oct. 7, 2025

(54) APPARATUS AND METHOD FOR CONTROLLING A RAILWAY SYSTEM

(71) Applicant: HITACHI RAIL STS S.P.A., Naples (IT)

(72) Inventors: Fabio Canigliula, Naples (IT); Luca Flaminio, Scafati (IT); Fausto Del Villano, Torre Annunziata (IT)

(73) Assignee: HITACHI RAIL STS S.P.A., Naples (IT)

( * ) Notice: Subject to any disclaimer, the term of this patent is extended or adjusted under 35 U.S.C. 154(b) by 614 days.

(21) Appl. No.: 17/626,045

(22) PCT Filed: Jul. 9, 2020

(86) PCT No.: PCT/IB2020/056451
§ 371 (c)(1),
(2) Date: Jan. 10, 2022

(87) PCT Pub. No.: WO2021/014260
PCT Pub. Date: Jan. 28, 2021

(65) Prior Publication Data
US 2022/0250665 A1    Aug. 11, 2022

(30) Foreign Application Priority Data
Jul. 25, 2019    (IT) .................. 102019000012900

(51) Int. Cl.
*B61L 15/00*    (2006.01)
*B61L 27/30*    (2022.01)
*H04L 67/12*    (2022.01)

(52) U.S. Cl.
CPC .......... *B61L 15/0063* (2013.01); *B61L 27/30* (2022.01); *H04L 67/12* (2013.01)

(58) Field of Classification Search
CPC ...... B61L 15/0063; B61L 27/30; B61L 27/33; H04L 67/12
See application file for complete search history.

(56) References Cited

U.S. PATENT DOCUMENTS 6,230,086 B1 *   5/2001   Oguma .................... B61L 3/24
                                                    701/19
6,374,165 B2 *   4/2002   Oguma .................. H04L 1/242
                                                    701/19

(Continued)

FOREIGN PATENT DOCUMENTS

CN    106945691 A    7/2017
EP    2253525 A1    11/2010

OTHER PUBLICATIONS

International Search Report and Written Opinion; priority document.
Italian Search Report; priority document.

*Primary Examiner* — Anne Marie Antonucci
*Assistant Examiner* — Patrick Daniel Mohl
(74) *Attorney, Agent, or Firm* — Greer, Burns & Crain, Ltd.

(57) ABSTRACT

A transportation system is controlled by an apparatus. The apparatus has a communicator adapted to communicate with a second apparatus. The apparatus also has a processor. When the communicator and the processor are controlling the transportation system, they are configured for transmitting to the second apparatus. A first status message defines a first status of the transportation system. When the communicator and the processor are being kept as a reserve for the second apparatus, the communicator and the processor are configured for receiving one second status message defining a second status of the transportation system from the second apparatus.

10 Claims, 3 Drawing Sheets

(56) References Cited

U.S. PATENT DOCUMENTS

2016/0227592 A1\* 8/2016 Potter .................... H04L 67/12
2017/0277151 A1 9/2017 Lie et al.

\* cited by examiner

APPARATUS AND METHOD FOR CONTROLLING A RAILWAY SYSTEM

This Application is a United States National Stage Application under 35 U.S.C. Section 371 of International Patent Application No. PCT/IB2020/056451 filed on 9 Jul. 2020, which is hereby incorporated by reference as if fully set forth herein. This Application also claims priority to and the benefit of Italian Patent Application No. 102019000012900, filed on 28 Jul. 2019, which is also hereby incorporated by reference as if fully set forth herein.

The present invention relates to an apparatus and a method for controlling a transportation system; in particular, for controlling (in real time) a railway network and/or railway rolling stock.

As is known, a railway network and/or railway rolling stock circulating thereon have to be utilized at best; the trains running on a given line must observe a given timetable and, most importantly, must maintain a certain distance from one another, so that safety is also ensured in addition to full commercial exploitation of the railway infrastructure.

In fact, proper control of the railway network and/or rolling stock is essential to avoid the occurrence of dangerous situations that, to be adequately handled, would require a reduction in the transportation capacity of the railway network and/or in the utilization of the rolling stock, e.g. by slowing down the train circulation speed on a railway line, by increasing the minimum distance between two trains along said line, or even by stopping the traffic on the railway network as required by the CENELEC 50129 standard (pages 67 and 128).

In order to avoid having to take such actions, the control system of the railway network and/or of the railway rolling stock must have a high level of availability, i.e. must be able to take appropriate control actions for a time interval that is as long as possible. Moreover, since the railway network and/or rolling stock are safety-critical systems, in addition to being available said control system must also comply with the time constraints imposed by the designers, since failure to observe such constraints would jeopardize the safety of the railway network.

In order to ensure the availability of the control system, redundant control systems are used in the railway field, i.e. control systems comprising two or more replications, wherein each one of them can ensure the (safe) operation of the railway network and/or rolling stock, so as to ensure the availability of the control system even in the event of a failure of one (or more) replications.

However, the use of several replications makes it necessary, the hardware being equal, to reduce the computation time per time cycle available to the processor of each replication for the execution of the instructions required for controlling the network and/or rolling stock, in that it is necessary that each replication updates the status data contained in its memory, which data represent the status of the network and/or rolling stock being controlled, so that all replications have the same data and can be mutually substituted within one or, at most, two operating cycles.

The time spent by each replication for keeping the status of the network and/or rolling stock up-to-date has some consequences as concerns the maximum number of input signals that can be managed; in fact, the cycle time being equal, an increased number of replications will cause a reduction in the number of manageable signals, because each replication will have to receive the signals coming from the sensors positioned along the network and/or on the rolling stock.

Therefore, in order to ensure compliance with the safety specifications, it is very often necessary to segment the network or the systems aboard the railway rolling stock into smaller portions, each one equipped with a control system of its own; in a critical system, in fact, the cycle time and the number of replications are design data that are determined in such a way as to cause the system to operate with specific safety properties, such as, for example, the maximum time that must elapse between the detection of an intrusion along a railway line and the actuation of the emergency brake on one or more trains located at less than three kilometres from the place where the intrusion was detected.

This leads to a less efficient utilization of the control systems, and also makes them more complex to design and operate, because a greater number of control systems makes it also necessary to implement more complex control logics requiring interaction between two or more control systems, as is the case when a problem occurs along a line segment which may also involve the adjoining segments, e.g. a derailment, an exceptional weather event, etc.

The present invention aims at solving these and other problems by providing an apparatus for controlling a transportation system.

Moreover, the present invention aims at solving these and other problems by providing also a method for controlling a transportation system.

The basic idea of the present invention is to configure a control apparatus (e.g. a PC, a microcontroller, or the like) in a manner such that is can operate in at least two operating modes: a first mode, in which it executes instructions adapted to control the transportation system, and a second mode, in which said apparatus is kept as a reserve for at least one second apparatus, thus creating a redundant control system. When the control apparatus is operating in the first operating mode, such apparatus is configured for transmitting to said at least one second apparatus at least one first status message defining a first status of said railway network and/or said railway rolling stock, whereas when it is operating in the second operating mode such apparatus is configured for receiving from said at least one second apparatus at least one second status message defining a second status of said railway network and/or said railway rolling stock.

In this way it is possible to keep the replications aligned without having the 'spare replications' communicate with the sensors installed along the railway network and/or on the rolling stock, thereby increasing the efficiency of the entire railway system because, the hardware being equal, it is possible to either manage a greater number of input signals or have a higher level of redundancy (i.e. a larger number of replications) while keeping the number of inputs constant. This makes it possible, advantageously, to increase the availability of the control system. Furthermore, since there is only one apparatus operating in the first operating mode, the railway network control operations are centralized, thus ensuring determinism as to the possible failure modes of the control system, so that such a control system will always be able to bring both itself and the railway network into a safe condition.

Further advantageous features of the present invention will be set out in the appended claims.

These features as well as further advantages of the present invention will become more apparent in the light of the following description of a preferred embodiment thereof as shown in the annexed drawings, which are provided merely by way of non-limiting example, wherein.

In this description, any reference to 'an embodiment' will indicate that a particular configuration, structure or feature is comprised in at least one embodiment of the invention. Therefore, expressions like 'in an embodiment' and the like, which can be found in different parts of this description, will not necessarily refer to the same embodiment. Moreover, any particular configuration, structure or feature may be combined as deemed appropriate in one or more embodiments. The references below are therefore used only for simplicity's sake, and shall not limit the protection scope or extension of the various embodiments.

Figure 1:
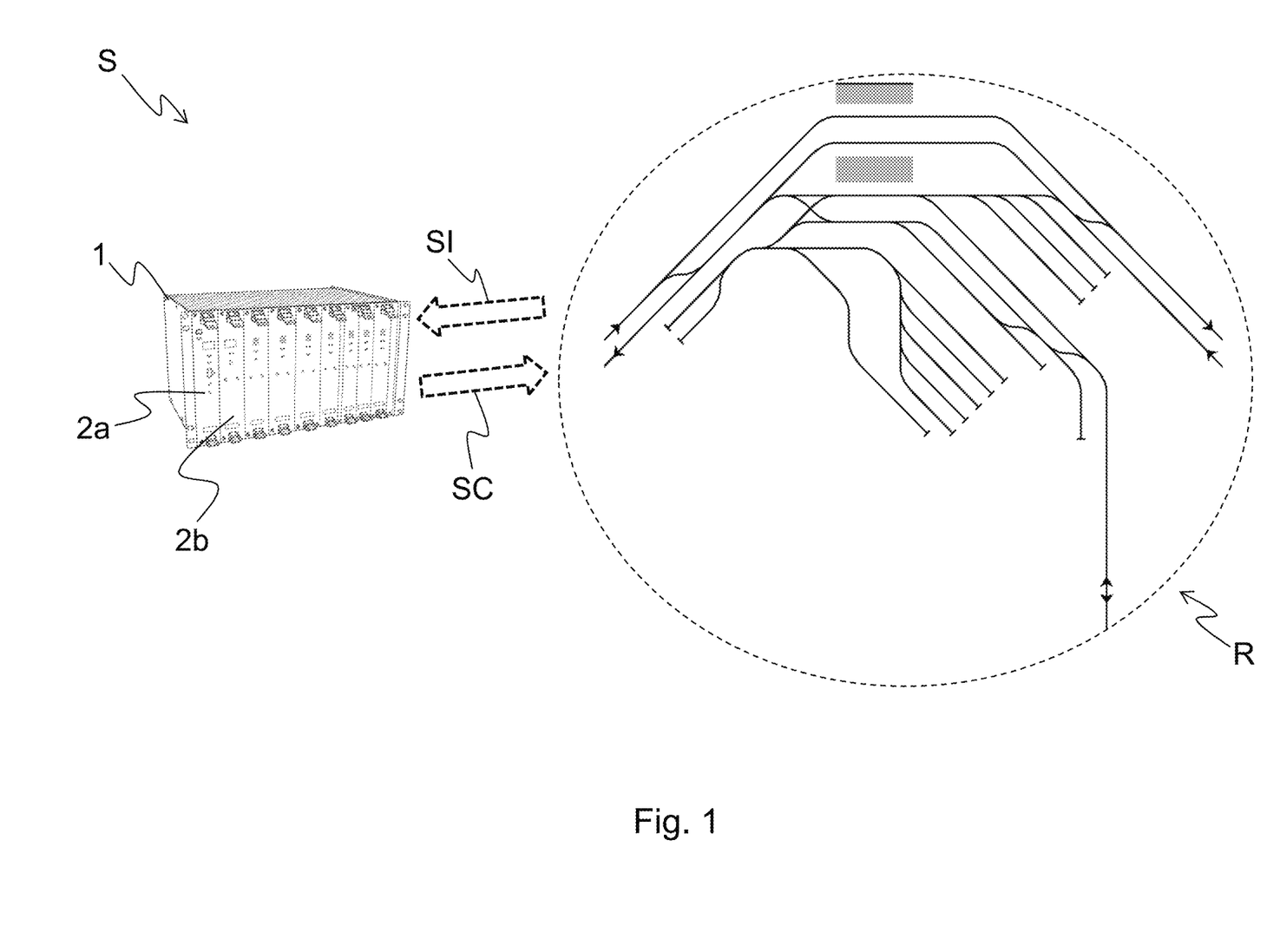
FIG. 1 shows a schematic view of a railway system comprising two apparatuses according to the invention.

With reference to FIG. 1, the following will describe a railway transportation system S; said railway transportation system S preferably comprises the following parts:
- a railway line R, along which at least one train can run (not shown in the annexed drawings);
- at least one sensor (not shown in the annexed drawings) positioned along the railway line, such as, for example, an intrusion sensor, a sensor adapted to detect the presence of a train at a given point of the line, or the like;
- at least one actuator (not shown in the annexed drawings) positioned along the railway line, such as, for example, a switch actuator, a relay controlling the power supply to a luminous signal or an overhead catenary, or the like;
- a control system 1 for controlling a railway line, comprising
   - a first apparatus 2a according to the invention, preferably in signal communication with said at least one sensor and said at least one actuator;
   - a second apparatus 2b according to the invention, preferably in signal communication with said at least one sensor and said at least one actuator.

It must be pointed out that the subject of the invention is also applicable to various parts of a railway system which do not need to be controlled in an automatic manner (such as, for example, train carriages).

Figure 2:
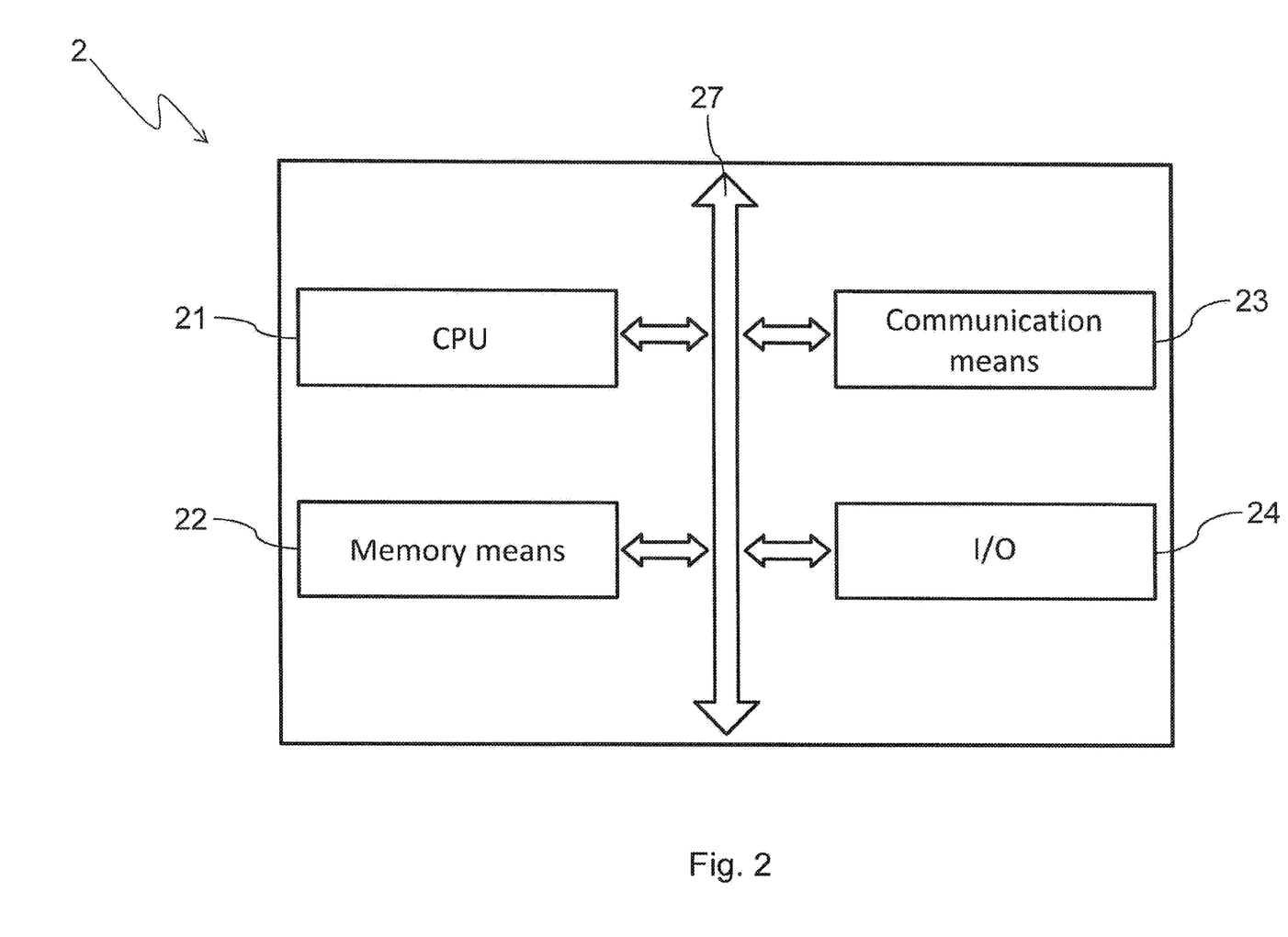
FIG. 2 shows an architecture of the apparatus according to the invention.

Also with reference to FIG. 2, the following will describe the apparatus 2 (designated in FIG. 1 by the symbols 2a and 2b); said apparatus 2 comprises the following components:
- control and/or processing means 21, e.g. one or more CPUs and/or a microcontroller and/or an FPGA and/or a CPLD and/or the like, adapted to allow the generation of messages for controlling the railway network, preferably in a programmable manner, via the execution of appropriate instructions;
- memory means 22, e.g. a random access memory (RAM) and/or a Flash memory and/or another type of memory, in signal communication with the control and/or processing means 21, wherein said memory means 22 preferably store at least the instructions that implement the method according to the invention, which can be read by the control and/or processing means 21 when the apparatus 2 is in an operating condition; also, said memory means 22 contain at least one set of instructions implementing the control logics that allow said apparatus 2 to control at least a portion of the railway network R;
- communication means 23, preferably an interface operating in accordance with the communication standards allowed by the ERTMS/ETCS system or one of the standard belonging to the IEEE 802.3 (also known as Ethernet), IEEE 802.11 (also known as WiFi) or 802.16 (also known as WiMax) families, or an interface to a GSM-R or GSM/GPRS/UMTS/LTE or TETRA data network, which allow the apparatus 2a to communicate with the other apparatus 2b as well as to acquire input signals SI from and transmit control signals SC to other elements of the railway network R, such as, for example, a rail signal, a sensor, or other apparatuses included in the railway system S;
- input/output means (I/O) 24, which may be used, for example, for connecting said apparatus 1 to a programming terminal configured for writing instructions (which the control and/or processing means 21 will then have to execute) into the memory means 22 and/or allowing the diagnosis of any failures suffered by said apparatus 2; such input/output means 24 may comprise, for example, a USB, Firewire, RS232, IEEE 1284, Ethernet, WiFi, Bluetooth adapter and/or a relay board capable of checking the status of a signal on the basis of a value written to a memory by the control and/or processing means 21, or the like;
- a communication bus 27 allowing information to be exchanged among the control and/or processing means 21, the memory means 22, the communication means 23 and the input/output means 24.

As an alternative to the communication bus 27, the control and/or processing means 21, the memory means 22, the communication means 23 and the input/output means 24 may be connected by means of a star architecture.

Figure 3:
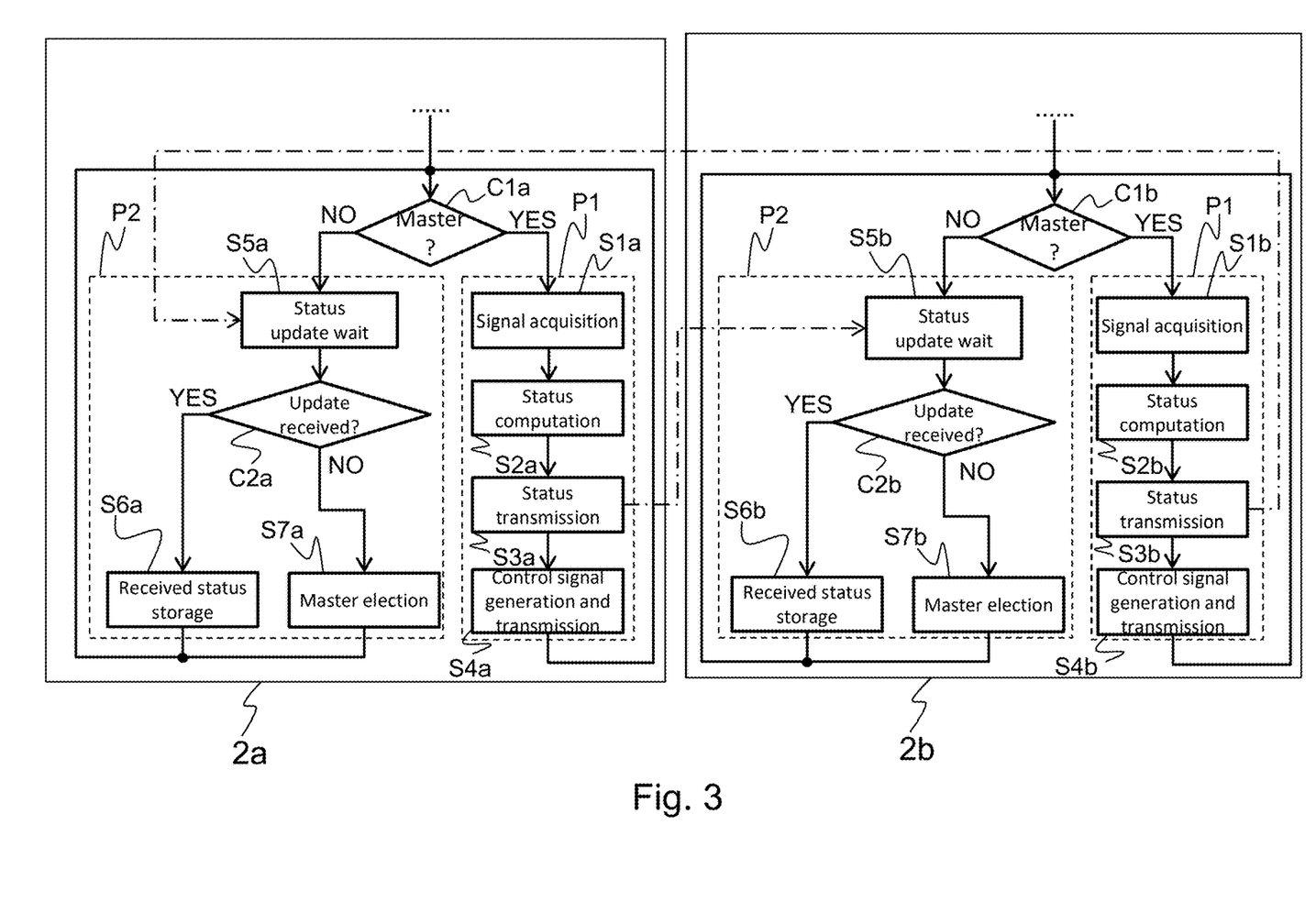
FIG. 3 shows a block diagram that describes the operation of the apparatuses of FIG. 1 when they execute a set of instructions implementing a method according to the invention.

Also with reference to FIG. 3, the following will describe a method for controlling a transportation system (e.g. a railway network) according to the invention, wherein said method is implemented by a set of instructions that can be executed by each one of the apparatuses 2a and 2b.

When each apparatus 2a,2b is in an operating condition, the control and/or processing means 21 execute a set of instructions implementing the method according to the invention; said method comprises at least the following phases:
a. a control phase P1, in which a transportation system comprising the railway network R and/or railway rolling stock is controlled through the control and/or processing means 21 and the communication means 22, and at least one first status message is transmitted, through said communication means 22, to at least one second apparatus (2b), wherein said first status message defines a first status of the transportation system (e.g. of the railway network R and/or of the rolling stock). When either one of the two apparatuses 2a,2b is in this phase, that apparatus has control over the network R (and/or the rolling stock), thus playing the 'master' role, i.e. that replication which implements the control logics that have been defined at design level and that allow control actions to be defined on the basis of the status of the network (and/or of the rolling stock), while the second apparatus is in stand-by;
b. a wait phase P2, in which at least one second status message is received, through said communication means 22, from said second apparatus 2a,2b, wherein said second status message defines a second status of said railway network and/or rolling stock. When either one of the two apparatuses 2a,2b is in this phase, that apparatus acts as a spare replication, also known as 'slave' or 'hot spare', i.e. it updates the status on the basis of the messages received from the 'master', without however implementing the control logics that can change the status of the network (and/or of the rolling stock).

In this way it is possible to keep the replications aligned without having the 'spare replications' communicate with the sensors installed along the railway network and/or on the rolling stock, thereby increasing the efficiency of the entire railway system because, the hardware being equal, it will be possible to either manage a greater number of input signals or have a higher level of redundancy (i.e. a larger number of replications) while keeping the number of inputs constant.

During the control phase P1, each one of the apparatuses 2a and 2b preferably executes the following steps:

signal acquisition step S1a, S1b, in which the input signals SI generated by the various sensors positioned along the railway network R (or aboard the rolling stock) are acquired through the communication means 23, and wherein in said signals SI data are encoded which represent the status of the network R, such as, for example, the status of a signal, the position of a switch or an isolator, or the like;

status computation step S2a, S2b, in which a representation of the status of the railway network R (e.g. a collection of data containing the status of all the sensors of the network R) is determined, through the control and/or processing means 21, on the basis of the input signals SI acquired during the signal acquisition step S1a, S1b;

status transmission step S3a, S3b, in which the first status message is generated, through the control and/or processing means 21, on the basis of the representation of the status of the railway network R, and said first message is transmitted, through the communication means 23, to the apparatuses 2a,2b that are in the wait phase P2, which will be described in detail hereinafter;

control signal generation and transmission step S4a,S4b, in which the control signals are generated, through the control and/or processing means 21, on the basis of the representation of the status of the railway network R and of the instructions implementing the control logics, stored in the memory means 22, such as, for example, a sequence of instructions that, when the intrusion by a person or an animal is detected along a railway line, will generate a signal causing the opening of a switch capable of interrupting a current circulating in an overhead catenary.

It must be pointed out that these steps must not necessarily be carried out in succession, but may be executed in a (partially) parallel manner, so as to advantageously reduce the computation time and hence make it possible to process a greater number of input signals.

During the wait phase P2, each one of the apparatuses 2a and 2b preferably executes the following steps:

status update wait step S5a,S5b, in which the apparatus waits for the reception, through the communications means 23, of a (second) status message generated by that apparatus 2a,2b which is in the control phase P1 (control signal generation and transmission S4a,S4b);

received status storage step S6a,S6b, in which the status data contained in the status message received from and generated by the apparatus 2a,2b in the control phase P1 are stored into the memory means 22, so that the apparatus in the wait phase P2 will be able to create or update its own representation of the status of the railway network R (e.g. a collection of data containing the status of all the sensors of the network R);

master election step S7a,S7b, in which it is determined which apparatus 2a,2b must become the master unit by using the previously described election algorithm. In other words, each one of the replications currently in the wait phase P2 determines (autonomously) if it should go into the control phase P2 (i.e. to become the master unit) on the basis of hierarchy data (which will be described hereinafter) stored in the memory means 22.

During the status update wait step S5a,S5b, the control and/or processing means 21 of each one of the apparatus 2a,2b preferably activate a timer, preferably lasting 50 to 150 milliseconds (e.g. in an application for managing the movements of rolling stock in a railway station (interlocking), the timer is preferably set to a duration of 100 milliseconds); afterwards, when such time has elapsed, the control and/or processing means 21 check if the communication means 23 have received the status message (e.g. by reading the contents of the buffer of said communication means 23) and decide (selection block C2a,C2b) whether to execute the received status storage step S6a,S6b (if the status message has been received) or to execute the master election step S7a,S7b (if the status message has not been received).

In addition to the above, the method according to the invention may also comprise an initialization phase, in which an apparatus 2a,2b decides whether it should enter phase P1 or phase P2. More in detail, the apparatuses 2a,2b are preferably configured for executing said initialization phase when they are activated (i.e. turned on and/or put in operation), during which the control and/or processing means 21 preferably execute a set of instructions implementing a joining procedure; such procedure makes it possible for each apparatus 2a,2b to join a group of other apparatuses 2a,2b in three possible scenarios:

1. the apparatus 2a,2b is joining a group of other apparatuses 2a,2b, wherein none of said apparatuses is currently in the control phase P1 (i.e. there are no active replications);
2. the apparatus 2a,2b is joining a group of other apparatuses 2a,2b, wherein none of said apparatuses is currently in the control phase P1 (i.e. there are no active replications), but simultaneously with an indefinite number of other apparatuses 2a,2b;
3. the apparatus 2a,2b is joining a group of other apparatuses 2a,2b, wherein at least one of such apparatuses is currently in the control phase P1 (i.e. there is at least one active replication).

In all these scenarios, the apparatus 2a,2b will reach a stable situation with an assigned role, i.e. only one of the active apparatuses 2a,2b will become the 'master'.

As aforementioned, the apparatus 2a,2b operating as 'master' represents the online unit that provides all the services required by the system, i.e. that controls the railway system S; such apparatus 2a,2b will periodically send the hierarchy data (during the status transmission step S3a, S3b) to the other apparatuses 2a,2b operating as 'slaves', preferably by using a unicast, multicast or broadcast transmission mode.

Those apparatuses 2a,2b which are operating as 'slaves' are constantly updated by the apparatus 2a,2b operating as 'master'; such apparatuses 2a,2b request periodically (typically at every operating cycle) to participate in the master hierarchy, i.e. to be entered into the hierarchy data, by transmitting a synchronization message through the communication means 23.

More in detail, the memory means 22 preferably contain at least the hierarchy data that represent a list of elements identifying at least one of said apparatuses 2a,2b, wherein the control and/or processing means 11, when they are operating in the second operating mode (wait phase P2), are preferably configured for deciding if they should operate in the first operating mode (control phase P1) on the basis of said hierarchy data. This decision is preferably made when the communication means 23 have not received the second status message within the expiry of a given time interval preferably lasting 30% of a round period (which will be further defined below) of the control system 1. In this manner, the decision as to whether or not to become the 'master' can be made independently by each apparatus, i.e. without the need for exchanging any additional messages with the other apparatuses. This makes it possible to increase the efficiency of the entire transportation system S because the rapid election of the new 'master' will reduce the probability that a situation might occur which would require, to be properly handled, a reduction in the efficiency of the railway network R, e.g. by reducing the speed of the trains or even stopping them.

The synchronization message preferably comprises at least one replication score that can be computed as follows.

The replication score (PS) is a value that represents the performance of the single apparatus 2a,2b (whether it is operating as the 'master' or as a 'slave'), which is computed on the basis of the requirements of the control system 1 and its evaluation metrics.

The replication score can be computed on the basis of two distinct contributions:

a common score (CSE), which is preferably determined on the basis of the number of devices (sensors and/or actuators) positioned along the line (e.g. signals, sensors, or the like) with which said apparatus 2a,2b can communicate. This makes it possible to handle situations in which the apparatus 2a,2b is fully operational, but a fault in the communication network is not allowing the apparatus 2a,2b to communicate with the devices positioned along the line, so that said apparatus 2a,2b can 'predictively' disable itself and let a new master be elected, which can reach all devices or anyway a greater number of devices. As an alternative or in combination, the common score (CSE) may be determined on the basis of the time necessary for completing the computation phase during which the control actions required for controlling the railway network R are determined; such score permits estimating the load status of each apparatus 2a,2b, which may vary depending on the number of processes that are currently active in each apparatus 2a,2b and on the scheduling of such processes (which is carried out by the scheduler of each apparatus 2a,2b). More in detail, the higher the CSE of a particular apparatus 2a,2b, the lower the computational load of said apparatus 2a,2b;

a discriminant score (DSE), which is preferably assigned statically to each apparatus 2a,2b; such score DSE is useful to determine the order of succession (i.e. the hierarchy) of the apparatuses 2a,2b when the CSEs are the same; therefore, in order to obtain a fully deterministic election of the 'master' (i.e. without using sequences generated by (pseudo) random generators or the like), the scores DSE assigned to the apparatus 2a,2b differ from one another.

More in detail, the replication score of a first apparatus 2a,2b ($PS_X$) will be considered to be higher than the replication score of a second apparatus 2a,2b ($PS_Y$) if the common score of the first apparatus ($CSE_X$) is higher than the common score of the second apparatus ($CSE_Y$), or, should the common scores ($CSE_X$,$CSE_Y$) be the same, the replication score of a first apparatus ($PS_X$) will be considered to be higher than the replication score of a second apparatus ($PS_Y$) if the discriminant score of the first apparatus ($DSE_X$) is higher than the discriminant score of the second apparatus ($DSE_Y$).

The following formula summarizes the above description.

$$PSx > PSy \text{ se } (CSEx > CSEy \| (CSEx == CSEy \ \&\& \ DSEx > DSEy)) \quad (1)$$

The replication score (PS) indicates the fitness of a given apparatus 2a,2b, so that the successor that will be chosen will always be the best apparatus 2a,2b.

The roles of the apparatuses 2a,2b are updated periodically (e.g. by electing a new master and downgrading the previous 'master' to 'slave'), preferably at a predetermined time (e.g. during the master election step S7a, S7b) defined according to the requirements of the real-time application of the system S. This period is called round period, and will be indicated below by the symbol $T_{RND}$.

The duration of the round period is defined at design level. By way of example, controlling a 250 km-long railway line whereon 120 high-speed trains can travel simultaneously (properly spaced out) will require a round cycle of approximately 500 milliseconds, whereas controlling a train switchyard with 300 installed sensors will require a round period of approximately 350 milliseconds.

When one of the apparatus 2a,2b is acting as 'master', it is configured for generating (during the status transmission step S3a,S3b) the hierarchy data on the basis of the synchronization messages received, through the communication means 23, from the other apparatuses 2a,2b acting as 'slaves', and for transmitting, through said communication means 23, a hierarchy message to the 'slave' apparatuses 2a,2b (still during the status transmission step S3a,S3b), wherein said hierarchy message contains at least said hierarchy data.

Should a failure occur which interrupts the (normal) operation of the 'master' apparatus 2a,2b (i.e. which does not allow it to send the hierarchy message), each 'slave' apparatus 2a,2b will wait a number of rounds corresponding to the position of said 'slave' apparatus 2a,2b in the hierarchy data before it will appoint itself (during the master election step S7a, S7b) as the 'master'.

The following table shows, by way of example, how the hierarchy data can be built on the basis of the scores received by four 'slave' apparatuses 2a,2b (SL1, . . . , SL4).

| 'Slave' number | Score (CSE, DSE) | Hierarchy data (line of succession) |
|---|---|---|
| $SL_1$ | (4, 1) | $SL_2 \rightarrow SL_3 \rightarrow SL_1 \rightarrow SL_4$ |
| $SL_2$ | (6, 2) | 1°  2°  3°  4° |
| $SL_3$ | (4, 3) | |
| $SL_4$ | (2, 4) | |

As can be inferred from the above hierarchy data, the 'slave' apparatus SL2 is the best candidate for the election as 'master'; in fact, should the 'master' apparatus fail (thus no longer transmitting the hierarchy message), the apparatus SL2 will become the master (during the master election step S7a, S7b) for the next round, and hence only the data of one round will be lost.

In other words, the control and/or processing means 11, when they are operating in the first operating mode (control phase P1), are preferably configured for executing the following steps:

receiving at least one first synchronization message from said at least one second apparatus 2a,2b through the communication means 23, wherein said synchronization message comprises a first replication score preferably determined on the basis of a number of sensors (e.g. sensors detecting the position of a switch, the presence of a train at a given point of the line, the presence of an intruder along the line, etc.) and/or actuators (e.g. hydraulic actuators for switches, electric isolators, etc.) with which said second apparatus 2a,2b can communicate and/or a level of availability of computational resources (e.g. the system load) of said second apparatus 2a,2b;

generating the hierarchy data on the basis of at least said first replication score, e.g. generating a line of succession as described above;

transmitting, through the communication means 23, a hierarchy message comprising said hierarchy data to said at least one second apparatus 2a,2b.

Conversely, when the control and/or processing means 21 are operating in the second operating mode (wait phase P2), they are preferably configured for executing the following steps:

determining a second replication score on the basis of a number of sensors and/or actuators with which said apparatus 2a,2b can communicate through said communication means 23 and/or the level of availability of computational resources of said apparatus 2a,2b;

transmitting, through the communication means 23, a second synchronization message comprising said second replication score to said second apparatus 2a,2b.

This ensures that the new 'master' will be that apparatus 2a,2b which is currently in the best situation as far as communications are concerned (i.e. which can reach the largest number of devices positioned along the railway line) and/or from a computational viewpoint (i.e. the apparatus with the lowest computational load), thus reducing the probability that a situation might arise (e.g. non-observance of time constraints) which, to be handled, would require a reduction in the efficiency of the railway network R. In this way it is possible to improve the efficiency of the transportation system S.

In summary, when the control system 1 is in an operating condition, the following steps are carried out at every operating cycle:

a. synchronization step, in which the 'slave' apparatuses 2a,2b (i.e. those which are currently in the wait phase P2 of the method according to the invention) participate in the hierarchy of the 'master' apparatus 2a,2b(i.e. the one currently in the control phase P1 of the method according to the invention) and come to know the hierarchy data (steps S5a,S5b and S6a,S6b) processed by the 'master' apparatus 2a,2b;

b. alignment step, in which the 'master' apparatus 2a,2b transmits, through the communication means 23, the status message (step S3a,S3b) to the 'slave' apparatuses 2a,2b, which thus come to know the status data of the railway network R (steps S5a,S5b and S6a,S6b).

More in detail, the synchronization step comprises the following substeps:

heartbeat substep, in which the 'master' apparatus 2a,2b transmits, through the communication means 23, a presence message to the 'slave' apparatuses 2a,2b (e.g. by using a broadcast transmission mode), so that they become aware of the presence of an active 'master' apparatus 2a,2b;

request substep, in which each one of the 'slave' apparatuses 2a,2b which have received the presence message transmits the synchronization message, through the communication means 23, preferably before a time interval elapses, so that the 'master' apparatus 2a,2b becomes aware of the active 'slave' apparatuses 2a,2b and their replication score. It must be pointed out that any apparatuses 2a,2b transmitting the synchronization message late, i.e. without observing the time constraint, will not be taken into account by the 'master' apparatus 2a,2b;

release substep, in which the 'master' apparatus 2a,2b transmits, through the communication means 23, the hierarchy message to the 'slave' apparatuses 2a,2b that transmitted the synchronization message (in observance of the time constraints).

After having received the hierarchy message, the 'slave' apparatuses 2a,2b remain waiting for the status message (alignment step).

If during the synchronization step the 'slave' apparatuses 2a,2b do not receive the hierarchy message from the 'master' apparatus 2a,2b within a given time interval (preferably equal to 7.5% of the round period) from the transmission of the synchronization messages or the reception of the presence messages, then the 'slave' apparatuses 2a,2b will elect a new 'master' (master election step S7a,S7b) on the basis of the hierarchy data received during the previous round, i.e. the apparatus which is first in the hierarchy data will become the 'master' and will go into the control phase P1, while the other 'slave' apparatuses 2a,2b will remain in the wait phase P2.

If during the request substep the 'master' apparatus 2a,2b receives no synchronization message from other 'slaves', that apparatus will not transmit any data during the release substep and the alignment step (status transmission step S3a,S3b).

The duration of the wait times during the above-described steps and substeps must be taken into consideration while designing and configuring a real-time control system; such times are defined as follows:

Master Sync Receiving Time (MSRT): this is the maximum duration of a time interval between the transmission of the presence message by the 'master' apparatus 2a,2b and the reception of one or more messages by the same 'master' apparatus 2a,2b;

Slave Sync Receiving Time (SSRT): this the maximum duration of a time interval between the transmission of the presence message by the 'slave' apparatus 2a,2b and the reception of the hierarchy message by the same 'slave' apparatus 2a,2b, and between the start of the round period and the reception of the presence message (heartbeat substep). It must be pointed out that the 'master' and 'slave' apparatuses 2a,2b are preferably synchronized through the use of a time synchronization protocol, such as, for example, the NTP protocol or the like), so that the start time of the round period will be essentially the same for all of them;

Slave Data Receiving Time (SDRT): this is the maximum duration of a time interval between the reception of the hierarchy message by the 'slave' apparatus 2a,2b and the reception of the status message by the same 'slave' apparatus 2a,2b.

These times can be chosen on the basis of the specific application. It must be pointed out that such times must be subtracted from the round period; therefore, the remaining time will be the actual time available to the control and/or processing means 21 of each apparatus 2 for the execution of the system applications, i.e. the so-called Applications Execution Time (AET), which is defined as follows:

$$AETMaster=TRND-(MSRT)$$

$$AETSlave=TRND-(2\cdot SSRT+SDRT) \quad (2)$$

It must be pointed out that the control system 1 can effectively manage n−1 successive failures, where n is the total number of replications (apparatuses 2a,2b) comprised in said control system 1.

Furthermore, by using the replication score, a 'master' apparatus 2a,2b may voluntarily abdicate (e.g. by not transmitting a message) in favour of the best slave, in that said 'master' apparatus 2a,2b may have entered a 'deteriorated' operating status (e.g. should a malfunction occur in the telecommunications network, or when it is executing memory defragmentation operations, or the like). This will guarantee the best availability and performance of the system services, thereby ensuring a high efficiency of the railway transportation network R. As aforementioned, the abdication may be effected by resetting the 'master' apparatus 2a,2b or by temporarily disabling the communication means 23 of said 'master' apparatus 2a,2b. In other words, the control and/or processing means 21, when they are operating in the first operating mode (control phase P1), are preferably configured for executing the following steps:

- determining a third replication score on the basis of a number of sensors and/or actuators with which said apparatus 2a,2b can communicate through the communication means 23 and/or a level of availability of computational resources of said apparatus 2a,2b;
- deciding if the transmission of the first status message should be inhibited on the basis of the first replication score and the third replication score, e.g. inhibiting the transmission of the first message if the third replication score is lower than the first replication score, i.e. if there is a 'slave' apparatus 2a,2b having a better score.

In order to make the operation of the railway system S more efficient, the synchronization message may also comprise, in addition to the replication score, a round number identifying the operating cycle.

In other words, at least one synchronization message preferably comprises a sequence datum (e.g. an integer number) identifying the operating cycle during which said at least one second apparatus 2a,2b has generated said first synchronization message, and wherein the control and/or processing means 21, when they are operating in the first operating mode (control phase P1), are preferably configured for generating the hierarchy data also on the basis of said sequence datum, e.g. discarding the synchronization message if the sequence datum contained in said synchronization message does not match the current sequence datum. In this manner, the 'master' apparatus 2a,2b will be prevented from using synchronization messages generated during previous operating cycles, thus reducing the risk that a dangerous situation might arise which would require, to be handled, a reduction in the efficiency of the transportation system S.

When an apparatus 2a,2b is activated and/or starts joining a group of other apparatuses, it is in an operating mode in which it executes the initialization phase of the method according to the invention, which, as previously described, is different from the phases P1 and P2; this means that such apparatus 2a,2b is operating neither as a 'master' nor as a 'slave'.

In addition to the above, each apparatus 2a,2b is configured for waiting (during the initialization phase) for the reception of a presence message from an active 'master' apparatus 2a,2b for a time interval preferably lasting a multiple of the round period of the control system. Afterwards, if the presence message has been received, the apparatus 2a,2b will enter the wait phase P2 of the method according to the invention (thus becoming a 'slave'); otherwise, if the presence message has not been received within the predefined time interval, the apparatus 2a,2b will enter the control phase P1, thus becoming the 'master'.

For the purpose of improving the efficiency of the railway network R, the apparatuses 2a,2b may transmit (during the initialization phase), through the communication means 23, an initialization message, the contents of which are similar to those of the synchronization message transmitted during the request substep, preferably when the above-mentioned time interval has elapsed, i.e. when said apparatus 2a,2b has detected that there is no other 'master' in activity.

In other words, the control and/or processing means 21 are preferably also configured for operating in a third operating mode (initialization phase), in which said control and/or processing means 21 are configured for executing the following steps:

- transmitting, through the communication means 23, a first initialization message to said at least one second apparatus 2a,2b, wherein said first initialization message comprises a fourth replication score determined on the basis of a number of sensors and/or actuators with which said apparatus 2,2a,2b can communicate through the communication means 23 and/or a level of availability of computational resources of said apparatus 2a,2b;
- receiving at least one second initialization message from said at least one second apparatus 2a,2b through the communication means 23, wherein said second initialization message comprises a fifth replication score determined on the basis of a number of sensors and/or actuators with which said second apparatus 2,2a,2b can communicate through the communication means 23 and/or a level of availability of computational resources of said second apparatus 2a,2b;
- deciding whether to operate in the first operating mode (control phase P1) or in the second operating mode (wait phase P2) on the basis of at least said fourth replication score and said fifth replication score.

In this way it is possible to manage the case wherein two or more apparatuses 2a,2b are started simultaneously, because upon reception of this message, if an apparatus 2a,2b has a score which is lower than that contained in the message, then that apparatus 2a,2b will be allowed to restart the initialization phase, so as to protect the railway network R in the event that the apparatus 2a,2b which has just become the 'master' should fail before starting the synchronization step. Moreover, this feature makes it possible to avoid that there might be two 'master' apparatuses 2a,2b at the same time.

The apparatuses 2a,2b executing the method according to the invention need to know the addresses of the other apparatuses 2a,2b, e.g. the IP address and/or the MAC address. It must be pointed out that, in order to implement the method according to the invention, the 'master' apparatus 2a,2b needs to know the addresses of the 'slave' apparatuses 2a,2b, and each 'slave' apparatus 2a,2b only needs to know the address of the 'master' apparatus 2a,2b. To this end, it is possible to use an external address management system (directory service) or to configure the addresses of each apparatus 2a,2b statically, i.e. to store the addresses of the other apparatuses 2a,2b into the memory means 22 of each one of said apparatuses 2a,2b.

Furthermore, when using broadcast and/or multicast addresses, the 'master' apparatus 2a,2b may send a message to all the 'slave' apparatuses 2a,2b by using a broadcast address being listened to by the 'slave' apparatuses 2a,2b.

Of course, the example described so far may be subject to many variations.

In particular, it must be pointed out that the above-described control system 1 may also be used for controlling transportation systems other than a railway network, such as, for example, a light-rail or on-road tram network, or the like.

Furthermore, the above-described control system 1 may also be used for controlling power production plants (such as nuclear, aeolian and fossil-fuel power plants), high-precision biomedical equipment (e.g. the Da Vinci system, suitable for both local and remote operation), avionic equipment (e.g. sensors, trim control systems, or the like), on-road transportation vehicles (e.g. autonomous vehicles and/or sensors thereof), etc.

Some of the possible variants of the invention have been described above, but it will be clear to those skilled in the art that other embodiments may also be implemented in practice, wherein several elements may be replaced with other technically equivalent elements. The present invention is not, therefore, limited to the above-described illustrative examples, but may be subject to various modifications, improvements, replacements of equivalent parts and elements without however departing from the basic inventive idea, as specified in the following claims.

The invention claimed is:

1. An apparatus for controlling a transportation system comprising:
    a communication means adapted to communicate with at least one second apparatus;
    a control and/or a processing means configured for operating at least in a first operating mode, in which the control and/or processing means executes instructions adapted to control the transportation system, or in a second operating mode, in which the apparatus is kept as a reserve for the at least one second apparatus,
    wherein the control and/or processing means, when operating in the first operating mode, are configured for transmitting to the at least one second apparatus at least one first status message defining a first status of the transportation system, and, when operating in the second operating mode, are configured for receiving from the at least one second apparatus at least one second status message defining a second status of the transportation system, the apparatus further comprising:
    a memory means containing at least hierarchy data representing a list of elements that identify at least one of the apparatus and the at least one second apparatus, wherein the control and/or processing means, when operating in the second operating mode, are configured for deciding whether to operate in the first operating mode on the basis of the hierarchy data,
    wherein the control and/or processing means, when operating in the second operating mode, are configured for deciding whether to operate in the first operating mode on the basis of the hierarchy data when the communication means has not received the second status message within a first time interval,
    wherein the control and/or processing means, when operating in the first operating mode, are configured for
        receiving at least one first synchronization message from the at least one second apparatus through the communication means, wherein the first synchronization message comprises a first replication score determined on a basis of a number of sensors and/or actuators with which the at least one second apparatus can communicate and/or a level of availability of computational resources of the at least one second apparatus,
        generating the hierarchy data on a basis of at least the first replication score,
        transmitting, through the communication means, a hierarchy message comprising the hierarchy data to the at least one second apparatus,
    wherein the first replication score is computed on the basis of:
        a common score determined on the basis of the number of devices with which said second apparatus can communicate, and/or the time necessary for completing control actions required for controlling the transportation system, and
        a discriminant score statically assigned to said second apparatus.

2. The apparatus according to claim 1, wherein the control and/or processing means, when operating in the second operating mode, are configured for
    determining a second replication score on the basis of a number of sensors and/or actuators with which the apparatus can communicate through the communication means and/or the level of availability of computational resources of the apparatus,
    transmitting, through the communication means, a second synchronization message comprising the second replication score to the at least one second apparatus.

3. The apparatus according to claim 2, wherein the at least one first synchronization message comprises a sequence datum that identifies an operating cycle during which the at least one second apparatus has generated the first synchronization message, and wherein the control and/or processing means, when operating in the first operating mode, are configured for generating the hierarchy data also on a basis of the sequence datum.

4. The apparatus according to claim 3, wherein the control and/or processing means, when operating in the first operating mode, are configured for
    determining a third replication score on the basis of a number of sensors and/or actuators with which the apparatus can communicate through the communication means and/or a level of availability of computational resources of the apparatus, and
    deciding if the transmission of the first status message should be inhibited on the basis of the first replication score and a basis of the third replication score.

5. The apparatus according to claim 4, wherein the control and/or processing means are also configured for operating in a third operating mode, in which the control and/or processing means are configured for
    transmitting, through the communication means, a first initialization message to the at least one second apparatus, wherein the first initialization message comprises a fourth replication score determined on the basis of a number of sensors and/or actuators with which the apparatus can communicate through the communication means and/or a level of availability of computational resources of the apparatus, receiving at least one second initialization message from the at least one second apparatus through the communication means, wherein the second initialization message comprises a fifth replication score determined on the basis of a number of sensors and/or actuators with which the at least one second apparatus can communicate through the communication means and/or a level of availability of computational resources of the at least one second apparatus, and deciding, on the basis of at least the fourth replication score and the fifth replication score, whether to operate in the first operating mode or in the second operating mode.

6. A method for controlling a transportation system, comprising:
   a control phase, in which the transportation system is controlled through a control and/or a processing means and a communication means comprised in a first apparatus, and at least one first status message is transmitted, through the communication means, to at least one second apparatus, wherein the first status message defines a first status of the transportation system; and
   a wait phase, in which at least one second status message is received, through the communication means, from the at least one second apparatus, wherein the second status message defines a second status of the transportation system,
   wherein, during the wait phase, a decision is made, through the control and/or processing means, if the control phase should be executed on the basis of hierarchy data representing a list of elements identifying at least one of the first apparatus and the at least one second apparatus,
   wherein, during the wait phase, a decision is made, through the control and/or processing means, if the control phase should be executed on the basis of the hierarchy data when the second status message has not been received within a first time interval,
   wherein, during the control phase, at least one first synchronization message is received, through the communication means, from the at least one second apparatus, wherein the synchronization message comprises a first replication score determined on a basis of a number of sensors and/or actuators with which the at least one second apparatus can communicate and/or a level of availability of computational resources of the at least one second apparatus, the hierarchy data are generated, through the control and/or processing means, on a basis of at least the first replication score, and a hierarchy message comprising the hierarchy data is transmitted, through the communication means, to the at least one second apparatus,
   wherein the first replication score is computed on the basis of:
      a common score determined on the basis of the number of devices with which said second apparatus can communicate, and/or the time necessary for completing control actions required for controlling the transportation system, and
      a discriminant score statically assigned to said second apparatus.

7. The method according to claim 6, wherein, during the wait phase, a second replication score is determined, through the control and/or processing means, on the basis of a number of sensors and/or actuators with which the first apparatus can communicate through the communication means and/or the level of availability of computational resources of the first apparatus, and a second synchronization message comprising the second replication score is transmitted, through the communication means, to the at least one second apparatus.

8. The method according to claim 7, wherein the at least one first synchronization message comprises a sequence datum that identifies the operating cycle during which the at least one second apparatus has generated the at least one first synchronization message, and wherein, during the control phase, the hierarchy data are generated, through the control and/or processing means, also on a basis of the sequence datum.

9. The method according to claim 8, wherein, during the control phase, a third replication score is determined, through the control and/or processing means, on the basis of a number of sensors and/or actuators with which the first apparatus can communicate through the communication means and/or a level of availability of computational resources of the first apparatus, and a decision is made if the transmission of the first status message should be inhibited on the basis of the first replication score and the third replication score.

10. The method according to claim 9, comprising an initialization phase, in which a first initialization message is transmitted, through the communication means, to the at least one second apparatus, wherein the first initialization message comprises a fourth replication score determined on the basis of a number of sensors and/or actuators with which the first apparatus can communicate through the communication means and/or the level of availability of computational resources of the first apparatus, at least one second initialization message is received from the at least one second apparatus through the communication means, wherein the second initialization message comprises a fifth replication score determined on the basis of a number of sensors and/or actuators with which the at least one second apparatus can communicate through the communication means and/or a level of availability of computational resources of them at least one second apparatus, and a decision is made, through the control and/or processing means, whether to execute the control phase or the wait phase on a basis of at least the fourth replication score and the fifth replication score.

* * * * *